United States Patent [19]

Takahashi

[11] Patent Number: 5,065,381
[45] Date of Patent: Nov. 12, 1991

[54] OPTICAL PICK-UP APARATUS
[75] Inventor: Shinichi Takahashi, Saitama, Japan
[73] Assignee: Pioneer Electronic Corporation, Tokyo, Japan
[21] Appl. No.: 363,814
[22] Filed: Jun. 9, 1989
[30] Foreign Application Priority Data
   Jul. 27, 1988 [JP] Japan .................. 63-98341[U]
[51] Int. Cl.⁵ .................................................. G11B 7/00
[52] U.S. Cl. ................................ 369/44.23; 369/111; 369/44.24; 369/112
[58] Field of Search ............... 369/44.41, 44.14, 44.23, 369/44.24, 112, 44.12, 44.11; 350/607, 96.29; 250/201.9, 201.1

[56] References Cited
U.S. PATENT DOCUMENTS
4,754,355  6/1988  Takahashi et al. .................. 360/114
4,767,921  8/1988  Kawasaki et al. .................. 369/44.23

Primary Examiner—Robert L. Richardson
Assistant Examiner—Nabih Hindi
Attorney, Agent, or Firm—Sughure, Mion, Zinn, Macpeak & Seas

[57] ABSTRACT

In an optical pick-up apparatus, light beam from a laser beam source is reflected by an optical element and is incident onto a disk. The optical pick-up apparatus comprises a support structure disposed in the optical element and making a deforming direction of the optical element caused by the support structure parallel or perpendicular to a track direction of the disk mirrored on the optical element. The support structure supports end edge portions of the optical element approximately opposed to each other in the parallel or perpendicular direction with respect to the track direction of the disk mirrored on the optical disk.

8 Claims, 2 Drawing Sheets

OPTICAL PICK-UP APARATUS

BACKGROUND OF THE INVENTION

The present invention relates to an optical pick-up apparatus and in particular, to an optical pick-up apparatus for providing a preferable reproducing signal.

In general, in an optical pick-up apparatus, an optical path from a semiconductor laser to a half mirror is inclined at a 45° angle with respect to a track direction of a disk, as is disclosed in Japanese Patent Application Laid-Open No. 61-39942 for example.

In this optical pick-up apparatus, as shown in FIGS. 1 and 2, light beam 2 emitted from semiconductor laser 1 is reflected by flat parallel half mirror 3 as an optical element and is converged on track 6 of disk 5 through objective lens 4. A portion of the light beam reflected by track 6 transmits half mirror 3 and astigmatism is thereby caused. Thus, elliptical light spots 8 and 8' deformed in accordance with the distance from objective lens 4 to disk 5 are formed on light receiving element 7 divided into four sections. Light spots 8 and 8' are utilized as a focus error signal so as to focus objective lens 4 on track 6 at any time.

At this time, as shown in FIG. 2, light receiving element 7 is disposed such that divisional lines 9 and 10 of light receiving element 7 are parallel and perpendicular to track direction 11 of disk 5 in order to perform the tracking control and remove the adverse effects on the focus error signal by the tracking control. Further, light receiving element 7 is formed such that the respective major axis directions of light spots 8 and 8' formed on light receiving element 7 are inclined at a 45° angle with respect to divisional lines 9 and 10, i.e., with respect to track direction 11. Direction 13 of light beam 2 from semiconductor laser 1 to half mirror 3 is set to be inclined at a 45° angle with respect to track direction 11.

In the above-mentioned optical pick-up apparatus, half mirror 3 is supported and fixed by adhesion, etc. to the interior of the apparatus, and the adhesive portion is shown by both end edge portions 14 and 15 of half mirror 3 as illustrated in FIG. 2. Therefore, there is a case in which an excessively fixing force is applied to half mirror 3 by the adhesion of this adhesive portion. In this case, as shown in FIG. 3, half mirror 3 is warped and deformed with center line 16 of the half mirror as a projected or recessed portion.

Since the above both end edge portions 14 and 15 are inclined at a 45° angle with respect to track direction 11, center line 16 is inclined at a 45° angle with respect to track direction. Accordingly, deforming direction 17 of the half mirror perpendicular to this center line is inclined at a 45° angle with respect to track direction 11. Therefore, there is a case in which astigmatism inclined at a 45° angle with respect to the track direction is caused in light beam 2 reflected by half mirror 3 due to distortion of a reflecting face of the half mirror by the deformation thereof. The astigmatism of reflecting light beam 2 sometimes causes astigmatism inclined at a 45° angle with respect to track direction 11 in the light spots irradiated onto disk 5.

However, the above-mentioned astigmatism of the light spots irradiated on the disk sometimes has an effect on a reproducing signal of the track. In particular, when the astigmatic direction is inclined at a 45° angle with respect to the track direction, a longitudinal axial direction of the elliptical light spot 8" would extend to cover the adjacent tracks as shown in FIG. 3A. As a result, as shown in the following table, the amount of cross talk from an adjacent track becomes largest, which is not preferable as a reproducing signal.

| Angle between astigmatism and track | Cross talk amount |
| --- | --- |
| 0° | 0.001 |
| 45° | 0.012 |
| 90° | 0.0003 |

In a conventional method for supporting the half mirror in the optical pick-up apparatus, as mentioned above, the astigmatic direction of the light spots on the disk caused by the deformation of the half mirror is inclined at a 45° angle with respect to the track direction, thereby generating a lot of cross talk.

SUMMARY OF THE INVENTION

To solve the conventional problems mentioned above, an object of the present invention is to provide an optical pick-up apparatus for obtaining a preferable reproducing signal without the effects of astigmatism caused by the deformation of an optical element.

With the above object in mind, the present invention resides in an optical pick-up apparatus in which the light beam from a laser beam source is reflected by an optical element and is incident onto a disk, said apparatus comprising a support structure disposed in said optical element and making a deformation direction of the optical element caused by the support structure parallel or perpendicular to a track direction of the disk mirrored on the optical element.

In accordance with the above-mentioned apparatus, the optical element has the support structure in which the deforming direction of the optical element caused by the support structure becomes parallel or perpendicular to the track direction of the disk mirrored on the optical element. Therefore, the light beam reflected by the optical element and irradiated onto the disk has astigmatism inclined at a 45° angle or 90° with respect to the track direction of the disk, thereby providing a preferable reproducing signal of the light beam irradiated onto the disk.

BRIEF DESCRIPTION OF THE DRAWINGS

The present invention will become more apparent from the following description of the preferred embodiments thereof in conjunction with the accompanying drawings in which.

DETAILED DESCRIPTION OF THE PREFERRED EMBODIMENTS

Figure 1:
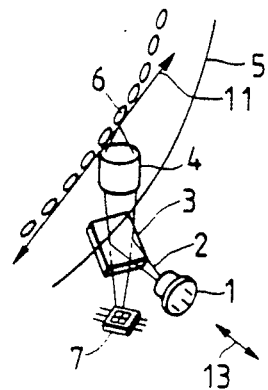
FIG. 1 is a perspective view showing a conventional optical pick-up apparatus.
Figure 2:
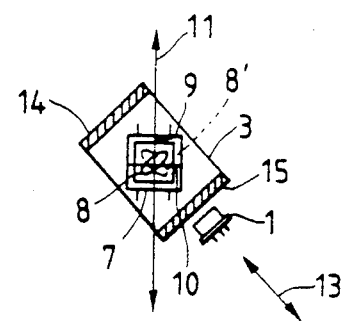
FIG. 2 is a plan view of conventional half mirror and light receiving element seen from a disk side of the conventional apparatus.
Figure 3:
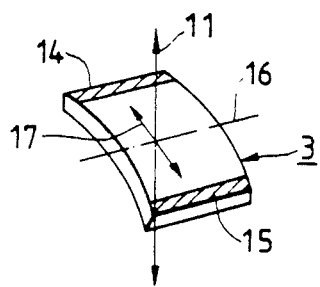
FIG. 3 is a perspective view showing a deforming state of the conventional half mirror.
Figure 3A:
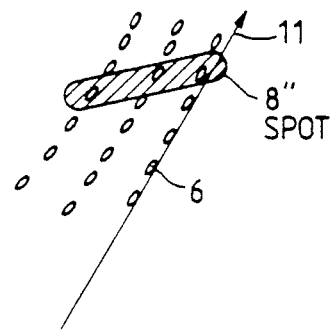
FIG. 3A is a schematic view showing the cross-talk caused by the inclined elliptical spot.
Figure 7:
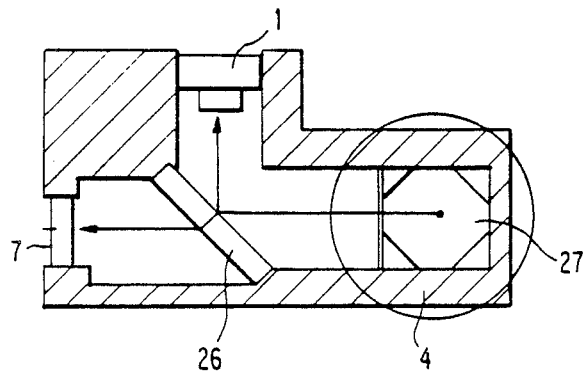
FIG. 7 is a top view of FIG. 6.
Figure 4:
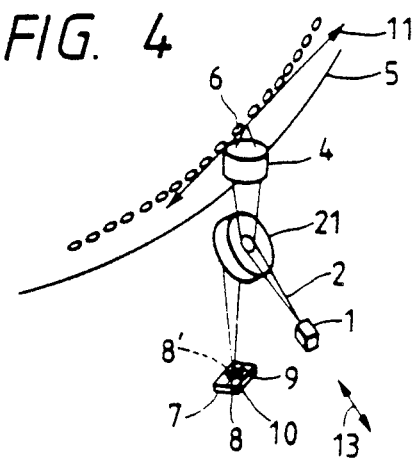
FIG. 4 is a perspective view showing one embodiment of an optical pick-up apparatus in accordance with the present invention.
Figure 5:
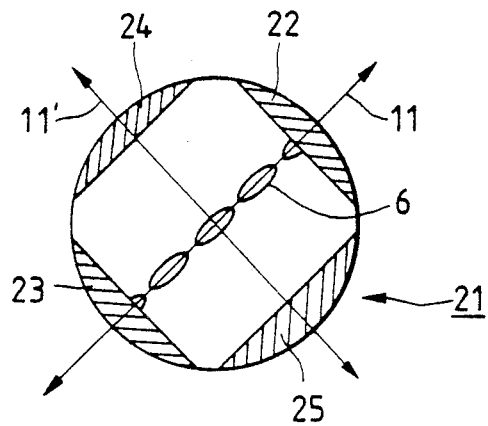
FIG. 5 is a plan view of a half mirror seen from the disk side in the above embodiment of the present invention.
Figure 6:
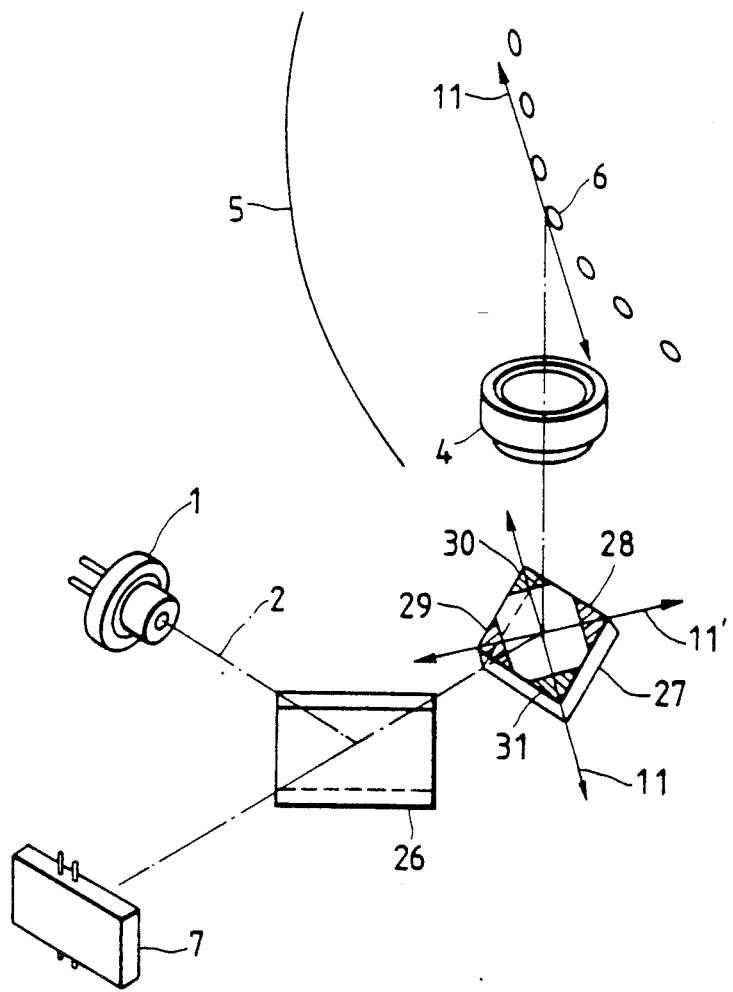
FIG. 6 is a perspective view showing another embodiment of the optical pick-up apparatus in accordance with the present invention.

The preferred embodiments of an optical pick-up apparatus in accordance with the present invention will now be described in detail with reference to the accompanying drawings. In FIGS. 4 to 6, the same or corresponding portions as those in FIGS. 1 to 3 are designated by the same reference numerals as those in FIGS. 1 to 3.

In FIG. 4, light beam 2 emitted from semiconductor laser 1 is reflected by flat parallel half mirror 21 having a circular shape in cross section as an optical element, and is converged through objective lens 4, thereby forming a light spot on track 6 of disk 5. A portion of the light beam reflected by track 6 transmits through half mirror 21 and causes astigmatism. This portion of the light beam then forms elliptical light spots 8 and 8' deformed in accordance with the distance from objective lens 4 to disk 5 on light receiving element 7 divided into four sections so that light spots 8 and 8' are utilized as a focus error signal.

Light receiving element 7 is disposed such that divisional lines 9 and 10 thereof are parallel and perpendicular to track direction 11 of disk 5 in order to perform a track control and remove the adverse effects on the focus error signal by the tracking control. Direction 13 of light beam 2 from semiconductor laser 1 to half mirror 21 is set to be inclined at a 45° angle with respect to track direction 11 such that the respective major axis directions of light spots 8 and 8' on light receiving element 7 are inclined at a 45° angle with respect to divisional lines 9 and 10, i.e., with respect to track direction 11.

As shown in FIG. 5, track 6 of disk 5 is mirrored on half mirror 21, and as shown in FIG. 5, when half mirror 21 is seen from the side of disk 5, track 6 mirrored on the mirror is aligned along the tangential direction of the track, i.e., track direction 11.

In the embodiment of the present invention, in half mirror 21, end edge portions 22 and 23 approximately opposed to each other and perpendicular with respect to track direction 11 of mirrored track 6 are supported and fixed to the optical pick-up apparatus. The fixing method is constructed by adhesion by an adhesive means, compression and fixation by a leaf spring, etc.

Even when an excessive fixing force is applied to the half mirror and the mirror is warped and deformed, this deforming direction is in conformity with track direction 11 by supporting and fixing half mirror 21 as mentioned above. Accordingly, even when astigmatism due to distortion of the reflecting face is caused in light beam 2 reflected by deformed half mirror 21, the astigmatic direction is directed to track direction 11 so that the angle between the astigmatic direction and the track direction becomes 0°. Since light beam 2 having the astigmatism in the track direction is irradiated on track 6 of disk 5 through objective lens 4, the astigmatic direction of the light spots formed on track 6 directed to track direction 11 (i.e., the longitudinal axial direction of the light spot) and the reproducing signal read out of disk 5 becomes a preferable signal having a very small cross talk amount from an adjacent track, as apparently seen from the previous table.

Further, when half mirror 21 is supported and fixed to the apparatus by end edge portions 24 and 25 approximately opposed to each other and parallel to track direction 11 of the track mirrored on the mirror, the deforming direction of the mirror is directed to a direction 11' perpendicular to track direction 11 so that the light beam reflected by this mirror has astigmatism inclined by angle 90° with respect to track direction 11. The direction of the astigmatism is such that the longitudinal axis of the light spot is perpendicular to the track direction 11, thereby causing a cross talk on the tracks. However, in this case, upon the adjustment of the optical element in the optical axis direction, it is possible to eliminate this cross talk by imparting an offset to the detection of the focus error so that the light spot on the track is in the form of a circle or an elliptical shape having a longitudinal axis in parallel with the track direction 11. Even in this case, a preferable reproducing signal having almost no cross talk is obtained as clearly seen from the previous table. Except for the case where the warpage or deformation of the mirror is remarkable, it is possible to suppress the adverse effects such as reduction of other signals for reproduction due to the imparting the offset as described above. It is thus possible to select a desired shape of the light spot 8' on the light receiving element 7.

FIG. 6 shows another embodiment of the optical pick-up apparatus in accordance with the present invention. In this embodiment, rectangular reflecting plate 27 as an optical element is arranged between half mirror 26 and objective lens 4, and the optical path of light beam 2 from semiconductor laser 1 to disk 5 is bent by reflecting plate 27, thereby making the entire apparatus compact. In this case, reflecting plate 27 supported and fixed to the interior of the apparatus is supported by end edge portions 28 and 29 approximately opposed to each other and parallel to track direction 11 of track 6 mirrored on reflecting plate 27.

When reflecting plate 27 is supported as mentioned above and is deformed, the deforming direction is directed to direction 11' perpendicular to track direction 11 so that the light beam reflected by deformed reflecting plate 27 and irradiated onto track 6 of the disk through objective lens 4 has astigmatism inclined at a 90° angle with respect to track direction 11. The reproducing signal read by the light beam having such astigmatism becomes a preferable signal having a very small cross talk.

It should be apparently understood from the above description that a preferable reproducing signal is obtained even when reflecting plate 27 is supported and fixed by end edge portions 30 and 31 perpendicular to track direction 11 and approximately opposed to each other.

Each of half mirror 21 and reflecting plate 27 is not limited to that in the above-mentioned embodiment with respect to the shape thereof, but may have any shape when these members can be securely supported and fixed.

As mentioned above, in the present invention, the optical element has the support structure in which the deforming direction of the optical element caused by the support structure becomes parallel or perpendicular to the track direction of the disk mirrored on the optical element. Accordingly, the light beam reflected by the optical element and irradiated onto the disk has astigmatism inclined at an angle of 0° or 90° with respect to the track direction of the disk. Thus, the reproducing signal of the light beam irradiated onto the disk becomes a preferable signal having no effects on the deformation of the optical element and having a very small cross talk.

What is claimed is:

1. An optical pick-up apparatus in which a light beam from a laser beam source is reflected by an optical element and is incident onto a disk, said apparatus comprising:

a support structure disposed in said optical element and making a deforming direction, of the optical element caused by the support structure, parallel to a track direction of the disk mirrored on the optical element.

2. An optical pick-up apparatus in which a light beam from a laser beam source is reflected by an optical element and is incident onto a disk, said apparatus comprising:

a support structure disposed in said optical element and making a deforming direction, of the optical element caused by the support structure, perpendicular to a track direction of the disk mirrored on the optical element.

3. An optical pick-up apparatus as claimed in claim 1, wherein said support structure supports end edge portions of the optical element approximately opposed to each other in the parallel direction with respect to the track direction of the disk mirrored on the optical disk.

4. An optical pick-up apparatus as claimed in claim 2, wherein said support structure supports end edge portions of the optical element approximately opposed to each other in the parallel direction with respect to the track direction of the disk mirrored on the optical disk.

5. An optical pick-up apparatus as claimed in claim 1, wherein said support structure supports end edge portions of the optical element approximately opposed to each other in the perpendicular direction with respect to the track direction of the disk mirrored on the optical disk.

6. An optical pick-up apparatus as claimed in claim 2, wherein said support structure supports end edge portions of the optical element approximately opposed to each other in the perpendicular direction with respect to the track direction of the disk mirrored on the optical disk.

7. An optical pick-up apparatus as claimed in claim 1, further comprising:

a reflecting plate arranged between said optical element and an objective lens, said support structure supporting edges of said reflecting plate, thereby causing a deforming direction of said reflecting plate to be parallel to said track direction of said disk.

8. An optical pick-up apparatus as claimed in claim 2, further comprising:

a reflecting plate arranged between said optical element and an objective lens, said support structure supporting edges of said reflecting plate, thereby causing a deforming direction of said reflecting plate to be parallel to said track direction of said disk.

* * * * *